United States Patent
Chan et al.

(10) Patent No.: US 9,780,671 B2
(45) Date of Patent: Oct. 3, 2017

(54) POWER COVERSION APPARATUS

(71) Applicant: GREEN SOLUTION TECHNOLOGY CO., LTD., New Taipei (TW)

(72) Inventors: Chia-Ming Chan, New Taipei (TW); Desi Pan, New Taipei (TW); Shian-Sung Shiu, New Taipei (TW); Li-Min Lee, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/259,070

(22) Filed: Sep. 8, 2016

(65) Prior Publication Data

US 2017/0093292 A1    Mar. 30, 2017

(30) Foreign Application Priority Data

Sep. 29, 2015  (CN) .......................... 2015 1 0629617

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
CPC ......... H02M 3/33507; H02M 3/33523; H02M 3/156–3/158; H02M 3/1588; H02M 1/08; H02M 2001/0009
USPC ................................. 323/222, 224, 282–285
See application file for complete search history.

(56) References Cited

U.S. PATENT DOCUMENTS

| | | | | |
|---|---|---|---|---|
| 5,521,809 A | * | 5/1996 | Ashley | H02J 1/10 307/82 |
| 5,923,549 A | * | 7/1999 | Kobayashi | H02M 7/4807 363/17 |
| 6,134,129 A | * | 10/2000 | Keller | H02J 1/102 307/58 |
| 6,995,548 B2 | * | 2/2006 | Walters | H02M 3/1584 323/272 |
| 2011/0068626 A1 | * | 3/2011 | Terlizzi | H02J 1/08 307/32 |

* cited by examiner

*Primary Examiner* — Yemane Mehari
(74) *Attorney, Agent, or Firm* — Jianq Chyun IP Office

(57) ABSTRACT

A power conversion apparatus including a power converter, a first output port, a second output port, a load detection circuit and an output selection circuit is provided. The power converter generates a first and a second output voltages having different voltage specification. The first and the second output ports respectively provide the received output voltages to a back end. The load detection circuit is coupled with the power converter and the second output port and detects a load requirement of a load connected to the second output port to generate a load detection signal. The power converter generates a first switch control signal according to the load detection signal to control the output selection circuit, such that the output selection circuit provides one of the first and the second output voltages in response to the first switch control signal.

11 Claims, 5 Drawing Sheets

POWER COVERSION APPARATUS

CROSS-REFERENCE TO RELATED APPLICATION

This application claims the priority benefit of Chinese application serial no. 201510629617.4, filed on Sep. 29, 2015. The entirety of the above-mentioned patent application is hereby incorporated by reference herein and made a part of this specification.

BACKGROUND

Field of the Invention

The invention is directed to a power conversion apparatus and more particularly, to a power conversion apparatus having a plurality of output ports.

Description of Related Art

With the enhancement of requirements of portable electronic products, power consumption is also increased. In order to meet users' charging demands and avoid spending a long time on waiting for the charging, a variety of quick charge techniques and related power conversion apparatus have also been developed.

In the current existing technique, the charge time of a portable electronic product may be shortened by increasing the charge current or providing a plurality of output voltages. However, with limitations from power specification of general transmission interfaces (e.g., USB) and specification of connectors, the charge methods using a large amount of current are significantly limited. Additionally, a power supply architecture with a plurality of output voltages wound encounter apparently increased difficulty in circuit design.

Specifically, in the currently existing power conversion apparatus structure having a plurality of voltage outputs, a plurality of power converters has to be applied for voltage conversion performed on different voltage specification, so as to provide different output ports with output voltages conforming to the voltage specification. However, such method cause the increase of circuit design complexity, and therefore, the volume of the entire power conversion apparatus is hard to be reduced.

SUMMARY

The invention provides a power conversion apparatus capable of implementing power supplying simultaneously from a plurality of output ports by sharing a power converter.

According to an embodiment of the invention, a power conversion apparatus including a power converter, a first output port, a second output port, a load detection circuit and an output selection circuit is provided. The power converter is configured to generate a first output voltage and a second output voltage, wherein the first output voltage and the second output voltage have different voltage specification. The first output port is coupled to power converter coupled to the power converter and configured to receive the first output voltage from the power converter and provide the received first output voltage to a back end. The second output port is configured to receive the first output voltage and the second output voltage and provide one of the received first and second output voltages to the back end. The load detection circuit is coupled to the power converter and the second output port and configured to detect a load requirement of a load connected with the second output port, so as to generate a load detection signal. The output selection circuit has a first input terminal, a second input terminal and a first output terminal. The first input terminal and the second input terminal are coupled to the power converter to the power converter to receive the first output voltage and the second output voltage respectively, and the first output terminal is coupled to the second output port. The power converter generates a first switch control signal according to the load detection signal to control the output selection circuit, such that the output selection circuit provides the one of the first output voltage and the second output voltage which conforms to the load requirement of the load to the second output port in response to the first switch control signal.

According to an embodiment of the invention, a power conversion apparatus including a power converter, a regular output port, at least one quick charge output port, a load detection circuit and an output selection circuit is provided. The power converter is configured to generate a plurality of output voltages having different voltage specification. The regular output port is coupled to the power converter and to receive a regular output voltage among the output voltages and provide the received regular output voltage to a back end. The at least one quick charge output port is configured to receive the output voltages and provide one of the received output voltages to the back end. The load detection circuit is coupled to the power converter and the quick charge output port and configured to detect a load requirement of a load connected to the quick charge output port, so as to generate a load detection signal. The output selection circuit has a plurality of input terminals and at least one output terminal. The input terminals are coupled to the power converter to respectively receive the output voltages, and the output terminal is correspondingly coupled to the quick charge output port. The power converter generates at least one switch control signal according to the load detection signal to control the output selection circuit, such that the output selection circuit provides the one of the output voltages which conforms to the load requirement of the load to the corresponding quick charge output port in response to the switch control signal.

According to an embodiment of the invention, a power conversion apparatus including a power converter, a regular output port, n quick charge output ports, a load detection circuit and an output selection circuit is provided. The power converter is configured to generate m output voltages having different voltage specification, wherein m is a positive integer greater than or equal to 2. The regular output port is coupled to the power converter and configured to receive a regular output voltage among the output voltages and provide the received regular output voltage to a back end. The n quick charge output ports are configured to receive the output voltages and respectively provide one of the received output voltages to the back end, wherein n is a positive integer greater than or equal to 1. The load detection circuit is coupled to the power converter and the n quick charge output ports and configured to detect load requirements of loads connected with the n quick charge output ports, so as to generate a load detection signal. The output selection circuit has m input terminals and n output terminals, the m input terminals are coupled to the power converter to respectively receive the output voltages, and the n output terminals are respectively coupled to the n quick charge output ports. The power converter generates at least (m−1) switch control signals according to the load detection signal to control the output selection circuit, such that the output selection circuit provides the one of the output voltages which conforms to the load requirement of one of the loads to the corresponding quick charge output port in response to the (m−1) switch control signals.

To sum up, in the power conversion apparatus of the invention, the output voltage conforming to the load requirement can be provided/assigned to the corresponding output port through the configuration of the output selection circuit. Thereby, the power supply device can achieve the application of providing the output voltages having different voltage specification to the plurality of output ports according to the load requirement by sharing a power converter, so as to dramatically reduce circuit design complexity of the power conversion apparatus.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
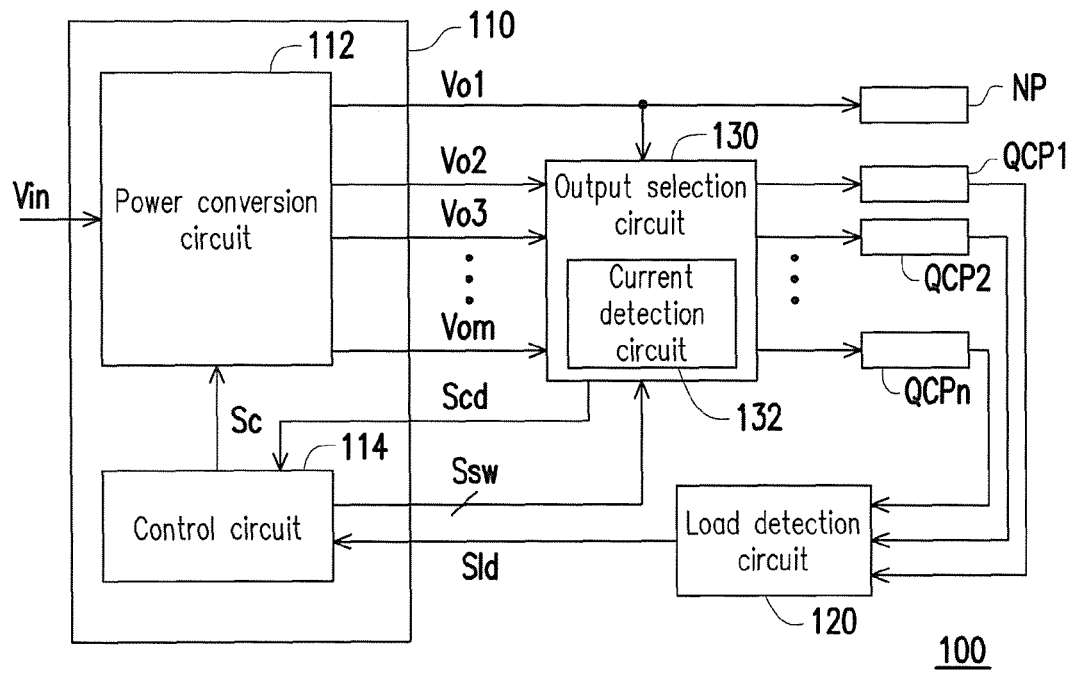
FIG. 1 is a schematic function block diagram illustrating a power conversion apparatus according to an embodiment of the invention.

In order to make the content of the invention clearer, the following embodiments are illustrated as examples that can be truly implemented by the invention. Wherever possible, the same reference numbers are used in the drawings and the description to refer to the same or like parts.

FIG. 1 is a schematic function block diagram illustrating a power conversion apparatus according to an embodiment of the invention. Referring to FIG. 1, a power conversion apparatus 100 of the present embodiment includes a power converter 110, a load detection circuit 120, an output selection circuit 130 and a plurality of output ports NP1 and QCP1-QCPn, wherein a value of n is a positive integer greater than or equal to 1, which may be defined by a designer. The output port NP1 regular output port (which is referred to as a regular output port NP1), and the output ports QCP1-QCPn may be, for example, quick charge output ports (which are referred to as quick charge output ports QCP1-QCPn).

In the present embodiment, the power converter 110 is configured to generate a plurality of output voltages Vo1-Vom having different voltage specification, wherein a value of m is a positive greater than or equal to 2, which may be defined by the designer. In other words, the power converter 110 generates output voltages Vo1-Vom having at least two different voltage specification. For example, the output voltage Vo1 may be, for example, a regular output voltage (which is referred to as a regular output voltage Vo1 hereinafter), and a voltage level thereof may be, for example, 5V (but the invention is not limited thereto). The output voltages Vo2-Vom may be, for example, quick charge output voltages (which are referred to as quick charge output voltage Vo2-Vom hereinafter) having different voltage specification, and voltage levels of the quick charge output voltage Vo2-Vom may be, for example, 9V, 12V, 15V and so on, respectively (but the invention is not limited thereto).

In the present embodiment, the power converter 110 includes a power conversion circuit 112 and a control circuit 114, for example. The power conversion circuit 112 is configured to convert a voltage of an input power Vin, so as to generate the output voltages Vo1-Vom. In this case, the power conversion circuit 112 may be, for example, a buck power conversion circuit or a flyback power conversion circuit, which is not limited in the invention.

On the other hand, the control circuit 114 is coupled with the power conversion circuit 112 and the output selection circuit 130. The control circuit 114 generates a control signal Sc according to an operation state of the power conversion apparatus 100 to control a power conversion operation of the power conversion circuit 112, wherein the control signal Sc may be, for example, a pulse-width modulation (PWM) signal.

The load detection circuit 120 is coupled to the control circuit 114 of the power converter 110 and quick charge output ports P2-Pn. The load detection circuit 120 is configured to detect load requirements of loads connected to the quick charge output ports QCP1-QCPn, so as to generate a load detection signal Sld. The load detection signal Sld is provided to the control circuit 114 of the power converter 110, such that the control circuit 114 generates a switch control signal Ssw for controlling the output selection circuit 130 according to the load detection signal Sld.

The output selection circuit 130 includes m input terminals and n output terminals. The input terminals of the output selection circuit 130 are coupled to each output of the power converter 110, so as to receive the output voltages Vo1-Vom, respectively. The output terminals of the output selection circuit 130 are respectively coupled to the quick charge output ports QCP1-QCPn.

To be specific, in the present embodiment, the regular output voltage Vo1 generated by the power conversion circuit 112 is provided to the regular output port NP1 and one of the input terminals of the output selection circuit 130, and the quick charge output voltage Vo2-Vom generated by the power conversion circuit 112 are respectively provided to the rest of the input terminals of the output selection circuit 130. The control circuit 114 generates the switch control signal Ssw according to the load detection signal Sld to control the output selection circuit 130, such that the output selection circuit 130, in response to the received switch control signal Ssw, provides the output voltages Vo1-Vom conforming to the load requirements of the loads connected to the corresponding quick charge output ports QCP1-QCPn. In other words, in the present embodiment, the regular output port NP1 always outputs the regular output voltage Vo1, and the quick charge output ports QCP1-QCPn correspondingly output the regular output voltage Vo1 or the quick charge output voltage Vo2-Vom according to the load requirements of the loads. In this case, the regular output voltage Vo1 refers to a rated voltage having a voltage specification satisfying the need of a regular load. For example, in an application scenario of a USB, the regular output voltage Vo1 corresponding to a USB port is 5V. Additionally, the quick charge output voltage Vo2-Vom refer to voltages required by the loads with voltage specification conforming to a quick charge mode/quick charge protocol, the voltage specification for the quick charge mode/quick charge protocol may be determined according to the design of a control chip and may be 9V, 12V and so on, but the invention is not limited thereto.

For example, if the regular output voltage Vo1 output by the power converter 110 is 5V, and the quick charge output voltage Vo1 is 9V. When a load having a rated voltage of 5V is connected to the quick charge output port QCP1, the load detection circuit 120 detects that the rated voltage of the load is 5V, and accordingly generates a load detection signal Sld indicating that the quick charge output port QCP1 requires for a power supply of 5V, such that the control circuit 114, in response to the load detection signal Sld, generates the corresponding switch control signal Ssw to control the output selection circuit 130, and thus, the output selection circuit 130 provides the regular output voltage Vo1 with the voltage level of 5V to the quick charge output port QCP1 according to the switch control signal Ssw. Similarly, if the rated voltage of the load connected to the quick charge output port QCP1 is 9V, the control circuit 114, in response to the load detection signal Sld, generates the corresponding switch control signal Ssw to control the output selection circuit 130, such that the output selection circuit 130 provides the quick charge output voltage Vo2 with the voltage level of 9V to the quick charge output port QCP1 according to the switch control signal Ssw.

Moreover, for example, when a load having a rated voltage of 5V and a load having a rated voltage of 9V are respectively connected to the quick charge output ports QCP1 and QCP2, the control circuit 114 generates the corresponding switch control signal Ssw according to the load detection signal Sld, such that the output selection circuit 130, in response to the switch control signal Ssw, respectively provides the regular output voltage Vo1 with the voltage level of 5V and the quick charge output voltage with the voltage level of 9V to the quick charge output ports QCP1 and QCP2.

It may be understood based on the above that through the aforementioned control method, the output selection circuit 130 of the present embodiment provides/assigns the output voltages Vo1-Vom conforming the load requirements to the corresponding quick charge output ports QCP1-QCPn, without configuring a plurality of power converters to convert the power supply demanded by each of the quick charge output ports QCP1-QCPn as the way provided in the related art. In other words, through the configuration and the control of the output selection circuit 130, the power conversion apparatus 100 of the present embodiment may achieve simultaneously providing the output voltages Vo1-Vom conforming to various voltage specification to the corresponding regular output port NP1 and the quick charge output ports QCP1-QCPn according to the load requirements by using the same power converter 110, so as to dramatically reduce the circuit design complexity of the power conversion apparatus 100.

Besides, the output selection circuit 130 of the present embodiment may be implemented by using an integrated chip, and thus, a current detection circuit 132 (which is optional and not limited in the invention) may be further configured in the output selection circuit 130. The current detection circuit 132 is configured to detect an amount of current provided to the regular output port NP1 and the quick charge output ports QCP1-QCPn through the output selection circuit 130, so as to generate and provide a current detection signal Scd to the control circuit 114 in the power converter 110, such that the control circuit 114 controls the operation of the power conversion circuit 112 based on the current detection signal Scd. For example, the control circuit 114 may compare the received current detection signal Scd with a reference current signal, so as to determine whether the amount of current provided to the regular output port NP1 and the quick charge output ports QCP1-QCPn conform to predetermined current requirement. If determining that the amount of the current currently output by the output selection circuit 130 is smaller than the predetermined current value according to the current detection signal Scd, the control circuit 114 correspondingly adjusts the control signal Sc, such that the power conversion circuit 112 increases the output current in response to the control signal Sc; otherwise, if determining that the amount of the current currently output by the output selection circuit 130 is greater than the predetermined current value according to the current detection signal Scd, the control circuit 114 correspondingly adjusts the control signal Sc, such that the power conversion circuit 112 decreases the output current in response to the control signal Sc, such that stable current output can be achieved.

In order to enable the specific structure and operation of the power conversion apparatus 100 of the invention more comprehensive to the persons with ordinary skills in the art, descriptions will be set forth in accordance to the circuit examples illustrated in FIG. 2 to FIG. 6.

Figure 2:
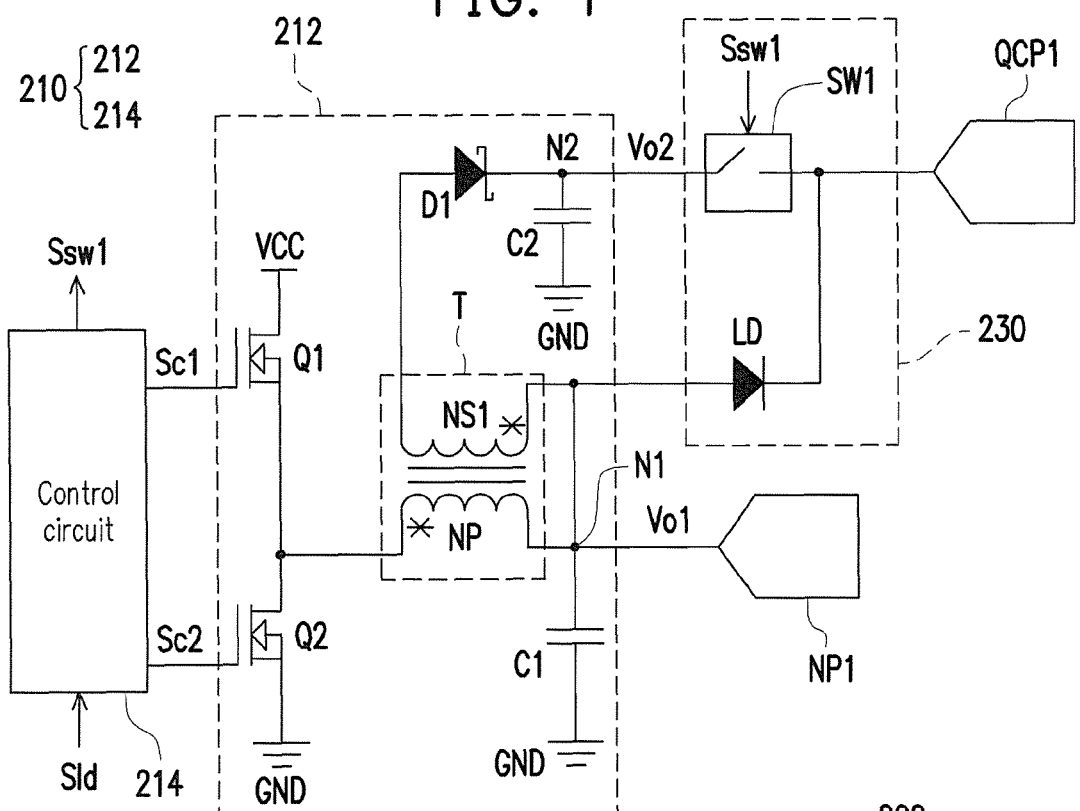
FIG. 2 is a schematic circuit structure diagram illustrating a power conversion apparatus according to a first embodiment of the invention.

FIG. 2 is a schematic circuit structure diagram illustrating a power conversion apparatus according to a first embodiment of the invention. Referring to FIG. 2, a power conversion apparatus 200 includes a power converter 210, a load detection circuit (not shown), an output selection circuit 230, a regular output port NP1 and a quick charge output port QCP1. The power converter 210 includes a power conversion circuit 212 and a control circuit 214.

In the present embodiment, the power conversion circuit 212 is composed of transistors Q1 and Q2, a transformer T, a diode D1 and capacitors C1 and C2. The transistors Q1 and Q2 are illustrated as N-type metal oxide semiconductor field effect transistors (MOSFET) in the present embodiment for example, but the invention is not limited thereto.

To be detailed, in the power conversion circuit 212, the transistors Q1 and Q2 are connected in series. A drain of the transistor Q1 receives a power supply voltage VCC, a source of the transistor Q1 is coupled to a drain of the transistor Q2, and a source of the transistor Q2 is coupled to a ground terminal GND. Gates of the transistors Q1 and Q2 are coupled to the control circuit 214 to respectively receive control signals Sc1 and Sc2.

The transformer T includes an input-side coil NP and an output-side coil NS1, where the input-side coil NP and the output-side coil NS1 are coupled with each other and have a specific turns ratios. The turns ratio may be defined by the designer according to the designer's demand for the voltage specification of the output voltage Vo1 and is not limited in the invention. In the present embodiment, a common-polarity terminal (i.e., a dotted terminal) of the input-side coil NP of the transformer T is coupled to a common node (i.e., the source of the transistor Q1 and the drain of the transistor Q2) of the transistors Q1 and Q2, and an opposite-polarity terminal (i.e., a non-dotted terminal) of the input-side coil NP is coupled to a the first terminal of the capacitor C1. The common-polarity terminal of the output-side coil NS1 of the transformer T is coupled to the first terminal of the capacitor C1 and the output selection circuit 230, and the opposite-polarity terminal of the output-side coil NS1 is coupled to an anode of the diode D1.

The anode of the diode D1 is coupled to the opposite-polarity terminal of the output-side coil NS1, and a cathode of the diode D1 is coupled to a first terminal of the capacitor C2. The capacitor C1 coupled between a node N1 and the ground terminal GND, and the capacitor C2 is coupled between the node N2 and the ground terminal GND.

In the present embodiment, the transistors Q1 and Q2 are alternately turned on in response to the received control signals Sc1 and Sc2, such that the input-side coil NP and the capacitor C1 of the back end is charged/discharged in response to the switching of the transistors Q1 and Q2 to generate a regular output voltage Vo1. The regular output voltage Vo1 is maintained at two terminals of the capacitor C1 and provided to the regular output port NP1.

Additionally, the output-side coil NS1 of the transformer T senses a current flowing through the input-side coil NP to generate an output-side current, in which the output-side current after being rectified by the diode D1 generates and maintains the quick charge output voltage Vo1 on the capacitor C2.

On the other hand, in the present embodiment, the output selection circuit 230 includes a current-limiting diode LD and a switch SW1. An anode (which may be considered as an input terminal of the output selection circuit 230) of the current-limiting diode LD is coupled to the common-polarity terminal of the output-side coil NS1 and the first terminal of the capacitor C1, and a cathode of the current-limiting diode LD is coupled to the quick charge output port QCP1. A first terminal (which may be considered as another input terminal of the output selection circuit 230) of the switch SW1 is coupled to the cathode of the diode D1 and the first terminal of the capacitor C2 (i.e., the node N2). A second terminal of the switch SW1 is coupled to the quick charge output port QCP1, and a control terminal of the switch SW1 receives the switch control signal Ssw1. In other words, the switch SW1 is coupled between the node N2 and the quick charge output port QCP1 and controlled by the switch control signal Ssw1 output by the control circuit 214 to switch to a conduction state, such that whether to transfer the quick charge output voltage Vo2 to the quick charge output port QCP1 is determined.

To be specific, when determining that the regular output voltage Vo1 conforms to the load requirement of the load connected to the quick charge output port QCP1 according to the load detection signal Sld, the control circuit 214 generates a disabled switch control signal Ssw1 according to the load detection signal Sld, such that the switch SW1 is turned off in response to the disabled switch control signal Ssw1. In this circumstance, the current-limiting diode LD is turned on in response to a forward voltage difference, such that the regular output voltage Vo1 is provided to the quick charge output port QCP1.

On the other hand, when determining that the quick charge output voltage Vo2 conforms to the load requirement of the load connected to the quick charge output port QCP1 according to the load detection signal Sld, the control circuit 214 generates an enabled switch control signal Ssw1 according to the load detection signal Sld, such that the switch SW1 is turned on in response to the enabled switch control signal Ssw1. In this circumstance, the quick charge output voltage Vo2 is provided to the quick charge output port QCP1 through the switch SW1, and the current-limiting diode LD is turned off in response to a reverse voltage difference. Through the aforementioned control mechanism, the operation of providing the regular output voltage Vo1 or the quick charge output voltage Vo2 to the quick charge output port QCP1 according to the load requirements may be achieved.

Figure 3:
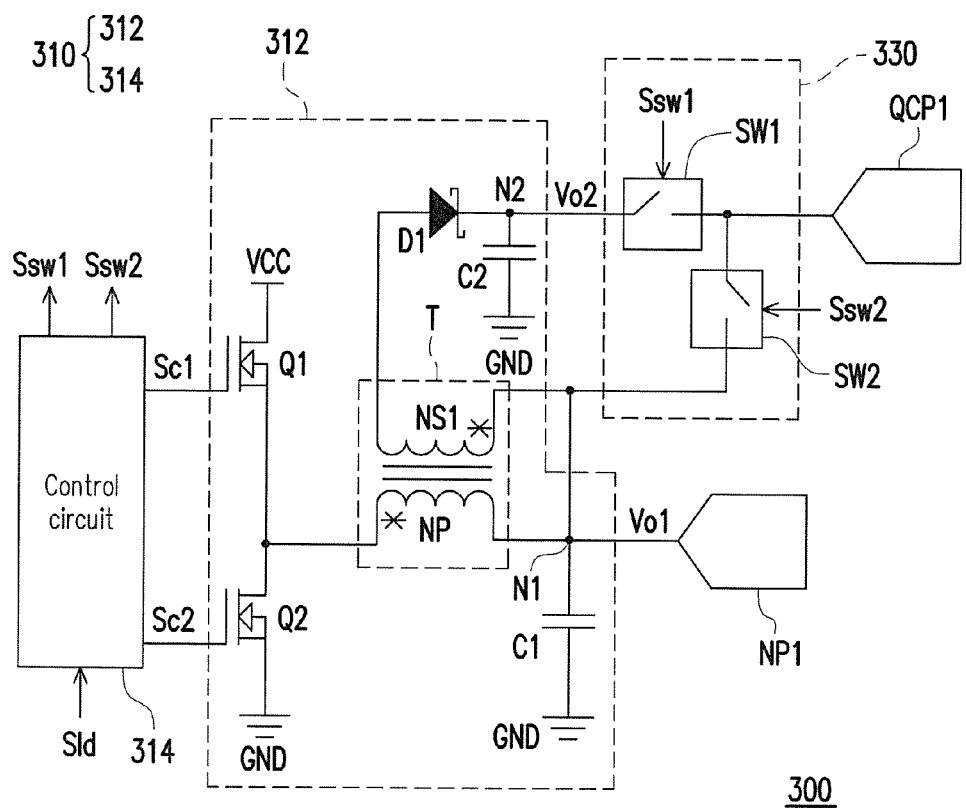
FIG. 3 is a schematic circuit structure diagram illustrating a power conversion apparatus according to a second embodiment of the invention.

FIG. 3 is a schematic circuit structure diagram illustrating a power conversion apparatus according to a second embodiment of the invention. Referring to FIG. 3, a power conversion apparatus 300 includes a power converter 310, a load detection circuit (not shown), an output selection circuit 330, a regular output port NP1 and a quick charge output port QCP1. The power converter 310 includes a power conversion circuit 312 and a control circuit 314.

The power converter 310 of the present embodiment is configured substantially in the same manner of the power converter 210 of the embodiment illustrated in FIG. 2. The difference between the two embodiments lies in the control circuit 314 of the present embodiment further generating a switch control signal Ssw2 according to the load detection signal Sld, and the other parts which are the same will not be repeatedly described.

The difference between the present embodiment and the embodiment illustrated in FIG. 2 mainly lies in the present embodiment using a switch SW2 in the output selection circuit 330 in replacement with the current-limiting diode LD of the previous embodiment. Except for that, the configuration of the switch SW1 is the same as the previous embodiment illustrated in FIG. 2.

To be detailed, in the output selection circuit 330, a first terminal of the switch SW2 is coupled to the common-polarity terminal of the output-side coil NS1 and the first terminal of the capacitor C1, a second terminal of the switch SW2 is coupled to the quick charge output port QCP1, and a control terminal of the switch SW2 receives the switch control signal Ssw2. In other words, the switch SW2 is coupled between the node N1 and the quick charge output port QCP1 and controlled by the switch control signal Ssw2 output by the control circuit 314 to switch to a conduction state, such that whether to transfer the regular output voltage Vo1 to the quick charge output port QCP1 is determined.

To be specific, when determining that the regular output voltage Vo1 conforms to the load requirement of the load connected to the quick charge output port QCP1 according to the load detection signal Sld, the control circuit 314 generates a disabled switch control signal Ssw1 and an enabled switch control signal Ssw2 according to the load detection signal Sld, such that the switch SW1 is turned off in response to the disabled switch control signal Ssw1, and the switch SW2 is turned on in response to the enabled switch control signal Ssw2. In this circumstance, the regular output voltage Vo1 is provided to the quick charge output port QCP1 through the turned-on switch SW2.

On the other hand, when determining that the quick charge output voltage Vo1 conforms to the load requirement of the load connected to the quick charge output port QCP1 according to the load detection signal Sld, the control circuit 214 generates an enabled switch control signal Ssw1 and a disabled switch control signal Ssw2 according to the load detection signal Sld, such that the switch SW1 is turned on in response to the enabled switch control signal Ssw1, and the switch SW2 is turned off in response to the disabled switch control signal Ssw2. In this circumstance, the quick charge output voltage Vo2 is provided to the quick charge output port QCP1 through the turned-on switch SW1. In comparison with the embodiment illustrated in FIG. 2, the implementation of using the switch SW2 in replacement with the current-limiting diode LD may further reduce power consumption of the power conversion apparatus 300.

Figure 4:
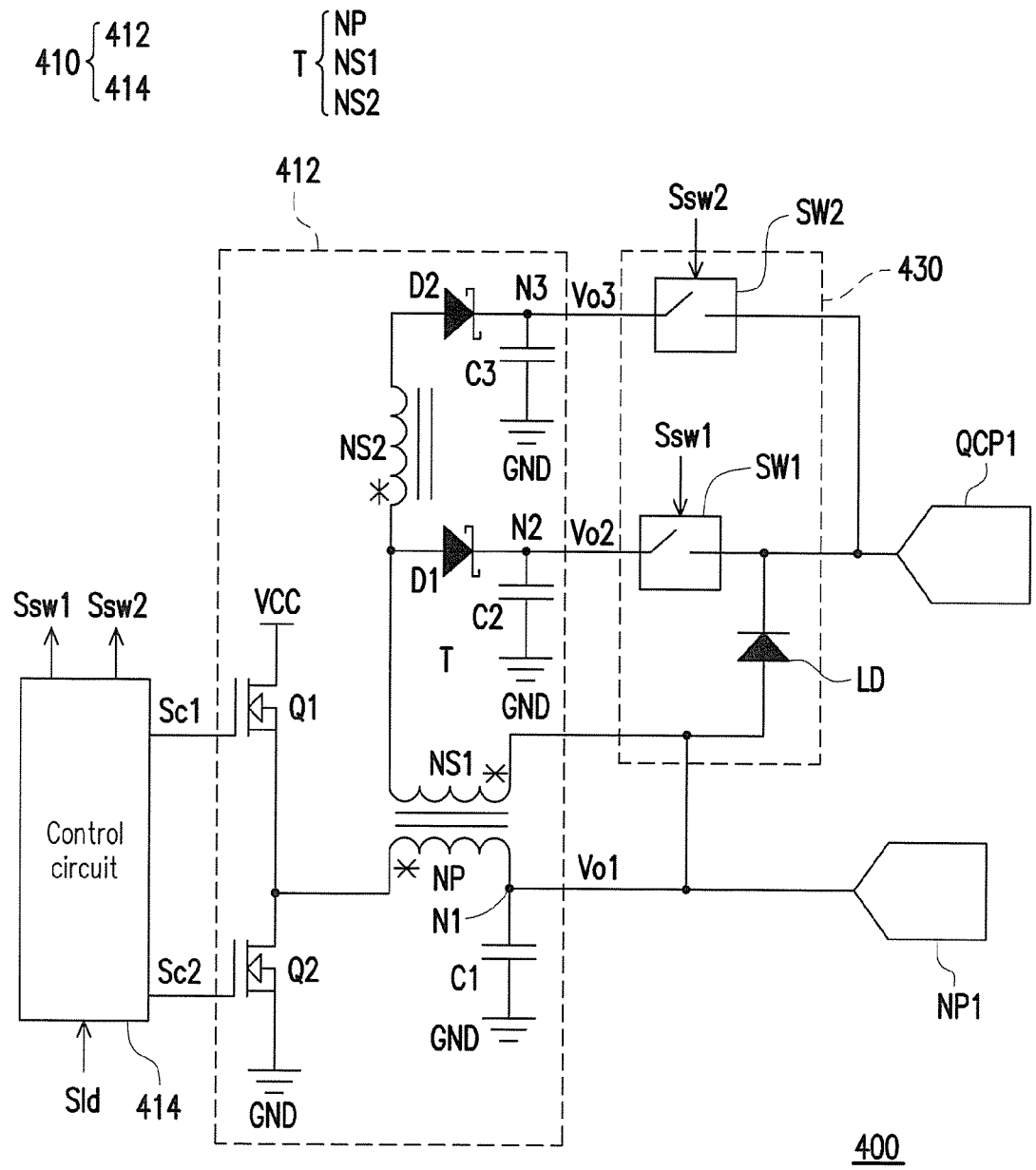
FIG. 4 is a schematic circuit structure diagram illustrating a power conversion apparatus according to a third embodiment of the invention.

FIG. 4 is a schematic circuit structure diagram illustrating a power conversion apparatus according to a third embodiment of the invention. A power conversion apparatus 400 of the present embodiment is an application of 3 output voltages Vo1-Vo3 corresponding to 2 output ports NP1 and QCP1. Referring to FIG. 4, the power conversion apparatus 400 includes a power converter 410, a load detection circuit (not shown), an output selection circuit 430, a regular output port NP1 and a quick charge output port QCP1. The power converter 410 includes a power conversion circuit 412 and a control circuit 414.

The power conversion circuit 412 of the present embodiment is configured substantially in the same manner of the power conversion circuit 212 of the embodiment illustrated in FIG. 2. The difference therebetween mainly lies in the power conversion circuit 412 of the present embodiment further including a diode D2 and a capacitor C3, and the transformer T of the present embodiment including not only the input-side coil NP and the output-side coil NS1, but also an output-side coil NS2.

In detail, in the power conversion circuit 412, a common-polarity terminal of the output-side coil NS2 is coupled to the anode of the diode D1 and the opposite-polarity terminal of the output-side coil NS1. An anode of the diode D2 is coupled to an opposite-polarity terminal of the output-side coil NS2. A first terminal of the capacitor C3 is coupled to a cathode of the diode D2, and a second terminal of the capacitor C3 is coupled to the ground terminal GND.

Therein, the output-side coils NS1 and NS2 of the transformer T sense a current flowing through the input-side coil NP to respectively generate corresponding output-side currents according to turns ratios thereof, in which the output-side current on the output-side coil NS2 which is rectified by the diode D2 generates and maintains the quick charge output voltages Vo3 on the capacitor C3.

On the other hand, the operation of the control circuit 414 of the present embodiment is substantially similar to the control circuit 214 of the embodiment illustrated in FIG. 2, and the difference therebetween only lines in the control circuit 414 of the present embodiment further generating a switch control signal Ssw2 according to the load detection signal Sid.

The output selection circuit 430 of the present embodiment includes a current-limiting diode LD, a switch SW1 and a switch SW2. The current-limiting diode LD and the switch SW1 are configured substantially in the same manner of the previous embodiment illustrated in FIG. 2 and thus, will not be repeatedly described.

In the output selection circuit 430 of the present embodiment, the first terminal of the switch SW2 is coupled to the cathode of the diode D2 and the first terminal of the capacitor C3 (i.e., a node N3). The second terminal of the switch SW2 is coupled to the quick charge output port QCP1, and the control terminal of the switch SW2 receives the switch control signal Ssw2. In other words, the switch SW1 coupled between the node N3 and the quick charge output port QCP1 and controlled by the switch control signal Ssw2 output by the control circuit 414 to switch to a conduction state, such that whether to transfer the quick charge output voltages Vo3 to the quick charge output port QCP1 is determined.

To be specific, when determining that the regular output voltage Vo1 conforms to the load requirement of the load connected to the quick charge output port QCP1 according to the load detection signal Sld, the control circuit 414 generates disabled switch control signals Ssw1 and Ssw2 according to the load detection signal Sld, such that the switches SW1 and SW2 are turned off in response to the disabled switch control signals Ssw1 and Ssw2. In this circumstance, the current-limiting diode LD is turned on in response to a forward voltage difference, such that the regular output voltage Vo1 is provided to the quick charge output port QCP1.

On other hand, when determining that the quick charge output voltage Vo2 conforms to the load requirement of the load connected to the quick charge output port QCP1 according to the load detection signal Sld, the control circuit 414 generates an enabled switch control signal Ssw1 and a disabled switch control signal Ssw2 according to the load detection signal Sld, such that the switch SW1 is turned on in response to the enabled switch control signal Ssw1, and the switch SW2 is turned off in response to the disabled switch control signal Ssw2. In this circumstance, the quick charge output voltage Vo2 is provided to the quick charge output port QCP1 through the switch SW1, and the current-limiting diode LD is turned off in response to a reverse voltage difference.

On other hand, when determining that the quick charge output voltages Vo3 conforms to the load requirement of the load connected to the quick charge output port QCP1 according to the load detection signal Sld, the control circuit 414 generates a disabled switch control signal Ssw1 and an enabled switch control signal Ssw2 according to the load detection signal Sld, such that the switch SW1 is turned off in response to the disabled switch control signal Ssw1, and the switch SW2 is turned on in response to the enabled switch control signal Ssw2. In this circumstance, the quick charge output voltages Vo3 is provided to the quick charge output port QCP1 through the switch SW2, and the current-limiting diode LD is turned off in response to a reverse voltage difference.

Figure 5:
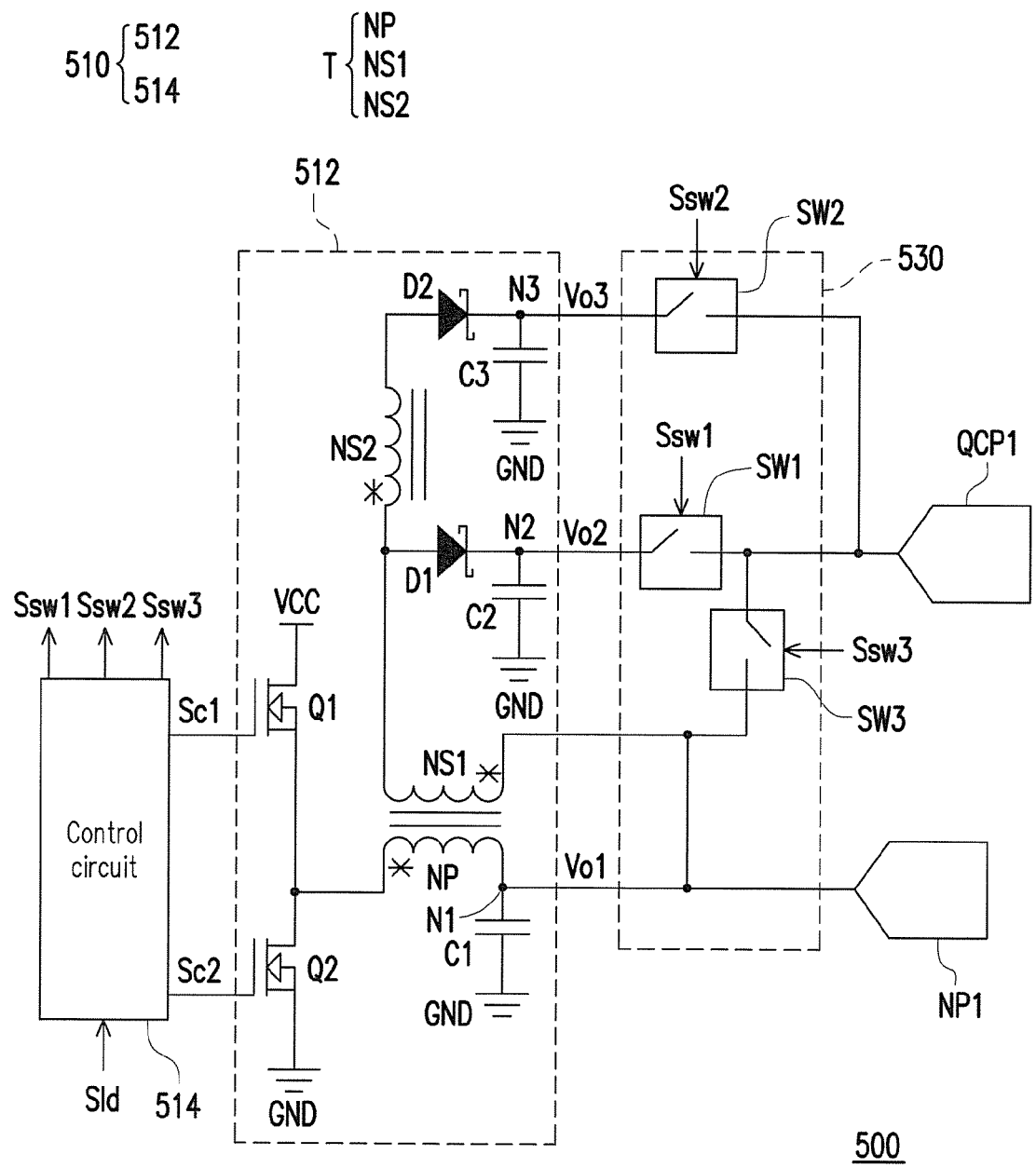
FIG. 5 is a schematic circuit structure diagram illustrating a power conversion apparatus according to a fourth embodiment of the invention.

FIG. 5 is a schematic circuit structure diagram illustrating a power conversion apparatus according to a fourth embodiment of the invention. Referring to FIG. 5, a power conversion apparatus 500 includes a power converter 510, a load detection circuit (not shown), an output selection circuit 530, a regular output port NP1 and a quick charge output port QCP1. The power converter 510 includes a power conversion circuit 512 and a control circuit 514.

The power converter 510 of the present embodiment is configured and operates substantially in the same manners of the power converter 410 of the embodiment illustrated in FIG. 4. The difference therebetween only lies in the control circuit 514 of the present embodiment further generating a switch control signal Ssw3 according to the load detection signal Sld, and the other parts which are the same will not be repeatedly described.

The difference between the present embodiment and the embodiment illustrated in FIG. 4 mainly lies in the present embodiment using a switch SW3 in the output selection circuit 530 in replacement with the current-limiting diode LD of the previous embodiment. Except for that, the configuration of the switches SW1 and SW2 is the same as the previous embodiment illustrated in FIG. 4.

To be detailed, in the output selection circuit 530, a first terminal of the switch SW3 is coupled to the common-polarity terminal of the output-side coil NS1 and the first terminal of the capacitor C1, a second terminal of the switch SW3 is coupled to the quick charge output port QCP1, and a control terminal of the switch SW3 receives the switch control signal Ssw3. In other words, the switch SW3 is coupled between the node N1 and the quick charge output port QCP1 and controlled by the switch control signal Ssw3 output by the control circuit 514 to switch to a conduction state, such that whether to transfer the regular output voltage Vo1 to the quick charge output port QCP1 is determined.

To be specific, when determining that the regular output voltage Vo1 conforms to the load requirement of the load connected to the quick charge output port QCP1 according to the load detection signal Sld, the control circuit 514 generates disabled switch control signals Ssw1 and Ssw2 and an enabled switch control signal Ssw3 according to the load detection signal Sld, such that the switches SW1 and SW2 are turned off in response to the disabled switch control signals Ssw1 and Ssw2, and the switch SW3 is turned on in response to the enabled switch control signal Ssw3. In this circumstance, the regular output voltage Vo1 is provided to the quick charge output port QCP1 through the turned on switch SW3.

On other hand, when determining that the quick charge output voltage Vo1 conforms to the load requirement of the load connected to the quick charge output port QCP1 according to the load detection signal Sld, the control circuit 514 generates an enabled switch control signal Ssw1 and disabled switch control signals Ssw2 and Ssw3 according to the load detection signal Sld, such that the switch SW1 is turned on in response to the enabled switch control signal Ssw1, and the switches SW2 and SW3 are turned off in response to the disabled switch control signals Ssw2 and Ssw3. In this circumstance, the quick charge output voltage Vo2 is provided to the quick charge output port QCP1 through the switch SW1.

On other hand, when determining that the quick charge output voltages Vo3 conforms to the load requirement of the load connected to the quick charge output port QCP1 according to the load detection signal Sld, the control circuit 514 generates an enabled switch control signal Ssw2 and a disabled switch control signals Ssw1 and Ssw3 according to the load detection signal Sld, such that the switch SW2 is turned on in response to the enabled switch control signal Ssw2, and the switches SW1 and SW3 are turned off in response to the disabled switch control signals Ssw1 and Ssw3. In this circumstance, the quick charge output voltages Vo3 is provided to the quick charge output port QCP1 through the switch SW2.

Figure 6:
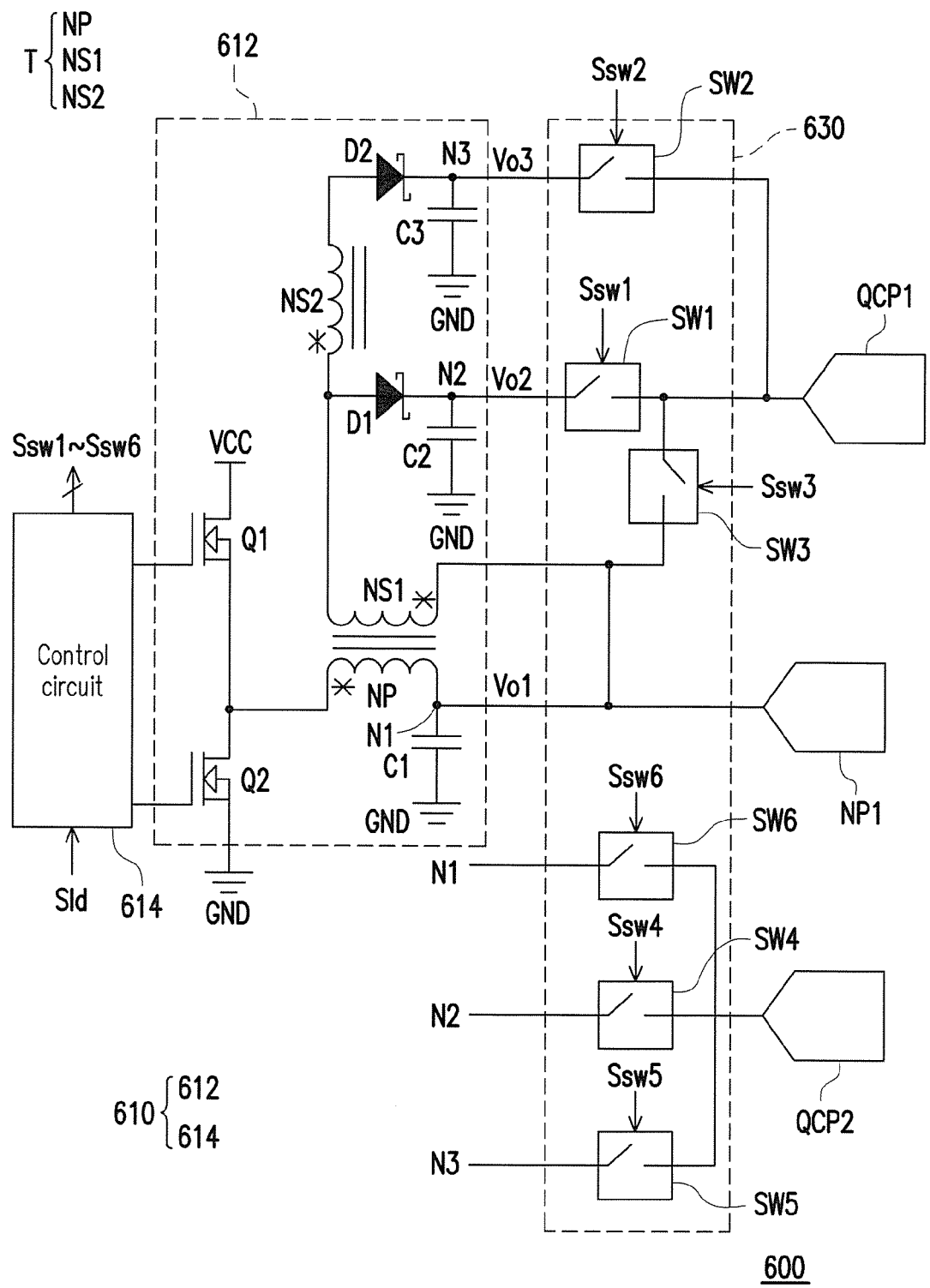
FIG. 6 is a schematic circuit structure diagram illustrating a power conversion apparatus according to a fifth embodiment of the invention.

FIG. 6 is a schematic circuit structure diagram illustrating a power conversion apparatus according to a fifth embodiment of the invention. A power conversion apparatus 600 of the present embodiment is an application of 3 output voltages Vo1-Vo3 corresponding to 3 output ports NP1, QCP1 and QCP2. Referring to FIG. 6, the power conversion apparatus 600 includes a power converter 610, a load detection circuit (not shown), an output selection circuit 630, a regular output port NP1 and a quick charge output ports QCP1 and QCP2. The power converter 610 includes a power conversion circuit 612 and a control circuit 614.

In the present embodiment, power converter 610 is configured and operates substantially in the same manners of the power converter 510 illustrated in FIG. 5. The difference therebetween only lies in the control circuit 614 of the present embodiment further generating a plurality of switch control signals Ssw4-Sw6 according to the load detection signal Sld, and the other parts which are the same will not be repeatedly described.

The difference between the present embodiment and the embodiment illustrated in FIG. 5 mainly lies in the output selection circuit 630 of the present embodiment further including switches SW4-SW6. The switch SW4 is coupled between the node N2 and the quick charge output port QCP2, the switch SW5 coupled between the node N3 and the quick charge output port QCP2, and the switch SW6 is coupled between the node N1 and the quick charge output port QCP2.

In this embodiment, the control circuit 614 generates corresponding switch control signals Ssw4-Ssw6 to control conduction states of the switches SW4-SW6 according to the load detection signal Sld, so as to achieve the operation of providing the output voltages Vo1-Vo3 having different voltage specification to the quick charge output port QCP2, which is similar to the operation of the control circuit 614 controlling the switches SW1-SW3 by using the switch control signals Ssw1-Ssw3, which may refer to the description with respect to the operations of the switches SW1-SW3 in the previous embodiment illustrated in FIG. 5 and thus, will not be repeated.

It should be mentioned that the persons with ordinary skills of the art may deduce the design of the circuit structure configuration and the control mechanism with respect to m output voltages V1-Vm corresponding to n quick charge output ports QCP1-QCPn based on the teaching from the previous embodiments illustrated in FIG. 3 through FIG. 6, and the invention is not limited to the numbers of the output voltages and the output ports set forth in the embodiments above.

It is to be additionally mentioned that in the applications of the embodiments of the invention, the switches SW1-SW6 may be implemented by MOS transistors, BJT transistors or other semiconductor components, which construe no limitations to the invention.

In light of the foregoing, the power conversion apparatus of the invention can provide/assign the output voltage conforming to the load requirement to the corresponding output port through the output selection circuit. Thereby, the power supply device can achieve the application of providing the output voltages having different voltage specification to the plurality of output ports according to the load requirement by sharing a power converter, so as to dramatically reduce circuit design complexity of the power conversion apparatus.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power conversion apparatus, comprising:
    a power converter, configured to generate a first output voltage and a second output voltage, wherein the first output voltage and the second output voltage have different voltage specification;
    a first output port, coupled to the power converter and configured to receive the first output voltage and provide the received first output voltage to a back end;
    a second output port, configured to receive the first output voltage and the second output voltage and provide one of the received first and second output voltages to the back end;
    a load detection circuit, coupled to the power converter and the second output port and configured to detect a load requirement of a load connected with the second output port, so as to generate a load detection signal; and
    an output selection circuit, having a first input terminal, a second input terminal and a first output terminal, wherein the first input terminal and the second input terminal are coupled to the power converter to receive the first output voltage and the second output voltage respectively, and the first output terminal is coupled to the second output port, wherein the power converter generates a first switch control signal according to the load detection signal to control the output selection circuit, such that the output selection circuit provides the one of the first output voltage and the second output voltage which conforms to the load requirement of the load to the second output port in response to the first switch control signal.

2. The power conversion apparatus according to claim 1, wherein the power converter comprises:
a power conversion circuit, configured to convert a voltage of an input power, so as to output the first output voltage and the second output voltage; and
a control circuit, coupled to the power conversion circuit and the output selection circuit and configured to control the power conversion operation of the power conversion circuit and generate the first switch control signal according to the load detection signal.

3. The power conversion apparatus according to claim 2, wherein the control circuit generates a first control signal and a second control signal, and the power conversion circuit comprises:
a first transistor, having a first terminal receiving a power supply voltage and a control terminal coupled to the control circuit to receive the first control signal;
a second transistor, having a first terminal coupled to a second terminal of the first transistor, a second terminal coupled to a ground terminal, and a control terminal coupled to the control circuit to receive the second control signal;
a first transformer, having an input-side coil and a first output-side coil, wherein a common-polarity terminal of the input-side coil is coupled to the second terminal of the first transistor and the first terminal of the second transistor;
a first diode, having an anode coupled to an opposite-polarity terminal of the first output-side coil;
a first capacitor, having a first terminal coupled to an opposite-polarity terminal of the input-side coil and a second terminal coupled to the ground terminal; and
a second capacitor, having a first terminal coupled to a cathode of the first diode and a second terminal coupled to the ground terminal.

4. The power conversion apparatus according to claim 3, wherein the output selection circuit comprises:
a current-limiting diode, having an anode coupled to a common-polarity terminal of the first output-side coil and a first terminal of the first capacitor, and a cathode coupled to the second output port; and
a first switch, having a first terminal coupled to the cathode of the first diode and the first terminal of the second capacitor, a second terminal coupled to the second output port and a control terminal receiving the first switch control signal, wherein the first switch is controlled by the first switch control signal to switch to a conduction state.

5. The power conversion apparatus according to claim 3, wherein the control circuit further generates a second switch control signal according to the load detection signal, and the output selection circuit comprises:
a first switch, having a first terminal coupled to the cathode of the first diode and the first terminal of the second capacitor, a second terminal coupled to the second output port and a control terminal receiving the first switch control signal, wherein the first switch is controlled by the first switch control signal to switch to a conduction state; and
a second switch, having a first terminal coupled to a common-polarity terminal of the first output-side coil and a first terminal of the first capacitor, a second terminal coupled to the second output port and a control terminal receiving the second switch control signal, wherein the second switch is controlled by the second switch control signal to switch to a conduction state.

6. The power conversion apparatus according to claim 3, wherein the power converter further generates a third output voltage, the transformer further has a second output-side coil mutually coupled with the input-side coil, a common-polarity terminal of the second output-side coil is coupled to the anode of the first diode and the opposite-polarity terminal of the first output-side coil, and the power conversion circuit further comprises:
a second diode, having an anode coupled to an opposite-polarity terminal of the second output-side coil; and
a third capacitor, having a first terminal coupled to a cathode of the second diode and a second terminal coupled to the ground terminal.

7. The power conversion apparatus according to claim 6, wherein the control circuit further generates a second switch control signal according to the load detection signal, and the output selection circuit comprises:
a current-limiting diode, having an anode coupled to a common-polarity terminal of the first output-side coil and a first terminal of the first capacitor and a cathode coupled to the second output port;
a first switch, having a first terminal coupled to the cathode of the first diode and the first terminal of the second capacitor, a second terminal coupled to the second output port and a control terminal receiving the first switch control signal, wherein the first switch is controlled by the first switch control signal to switch to a conduction state; and
a second switch, having a first terminal coupled to the cathode of the second diode and the first terminal of the third capacitor, a second terminal coupled to the second output port and a control terminal receiving the second switch control signal, wherein the second switch is controlled by the second switch control signal to switch to a conduction state.

8. The power conversion apparatus according to claim 6, wherein the control circuit further generates a second switch control signal and a third switch control signal according to the load detection signal, and the output selection circuit comprises:
a first switch, having a first terminal coupled to the cathode of the first diode and the first terminal of the second capacitor, a second terminal coupled to the second output port and a control terminal receiving the first switch control signal, wherein the first switch is controlled by the first switch control signal to switch to a conduction state;
a second switch, having a first terminal coupled to the cathode of the second diode and the first terminal of the third capacitor, a second terminal coupled to the second output port and a control terminal receiving the second switch control signal, wherein the second switch is controlled by the second switch control signal to switch to a conduction state; and
a third switch, having a first terminal coupled to the common-polarity terminal of the first output-side coil and the first terminal of the first capacitor, a second terminal coupled to the second output port and a control terminal receiving the third switch control signal, wherein the third switch is controlled by the third switch control signal to switch to a conduction state.

9. The power conversion apparatus according to claim 1, wherein the output selection circuit comprises a current detection circuit, the current detection circuit is configured to detect an amount of current flowing through the output selection circuit and provided to the first output port and the second output port, so as to generate and provide a current detection signal to the power converter.

10. A power conversion apparatus, wherein comprising:
a power converter, configured to generate a plurality of output voltages having different voltage specification;
a regular output port, coupled to the power converter and configured to receive a regular output voltage among the output voltages and provide the received regular output voltage to a back end;
at least one quick charge output port, configured to receive the output voltages and provide one of the received output voltages to the back end;
a load detection circuit, coupled to the power converter and the at least one quick charge output port and configured to detect a load requirement of a load connected with the at least one quick charge output port, so as to generate a load detection signal; and
an output selection circuit, having a plurality of input terminal and at least one output terminal, wherein the input terminals are coupled to the power converter to respectively receive the output voltages, and the at least one output terminal is correspondingly coupled to the at least one quick charge output port,
wherein the power converter generates at least one switch control signal according to the load detection signal to control the output selection circuit, such that the output selection circuit provides the one of the output voltages which conforms to the load requirement of the load to the corresponding quick charge output port in response to the at least one switch control signal.

11. A power conversion apparatus, comprising:
a power converter, configured to generate in output voltages having different voltage specification, wherein m is a positive integer greater than or equal to 2;
a regular output port, coupled to the power converter and configured to receive a regular output voltage among the output voltages and provide the received regular output voltage to a back end;
n quick charge output ports, configured to receive the output voltages and respectively provide one of the received output voltages to the back end, wherein n is a positive integer greater than or equal to 1;
a load detection circuit, coupled to the power converter and the n quick charge output ports and configured to detect load requirements of loads connected to the n quick charge output ports, so as to generate a load detection signal; and
an output selection circuit, having m input terminals and n output terminals, where the m input terminals are coupled to the power converter to respectively receive the output voltages, and the n output terminals are respectively coupled to the n quick charge output ports,
wherein the power converter generates at least (m−1) switch control signals according to the load detection signal to control the output selection circuit, such that the output selection circuit provides the one of the output voltages which conforms to the load requirement of the load to the corresponding quick charge output port in response to the (m−1) switch control signals.

* * * * *